United States Patent

[11] 3,631,839

[72] Inventor Pascual Agustin Postigo
  Fernandez Gimenez, 13, Segovia, Spain
[21] Appl. No. 862,669
[22] Filed Oct. 1, 1969
[45] Patented Jan. 4, 1972
[32] Priority Oct. 2, 1968
[33] Spain
[31] 141985

[54] HYGENIC, VARIABLE CONFINEMENT AREA PIGPEN
  4 Claims, 11 Drawing Figs.
[52] U.S. Cl..................................................... 119/20, 119/27
[51] Int. Cl..................................................... A01k 01/02
[50] Field of Search............................................ 119/20, 16, 15, 27

[56] References Cited
UNITED STATES PATENTS

| | | | |
|---|---|---|---|
| 3,125,988 | 3/1964 | King.............................. | 119/20 |
| 3,181,503 | 5/1965 | Tripp............................. | 119/20 |
| 3,318,286 | 5/1967 | Hargett, Jr..................... | 119/20 |
| 3,412,711 | 11/1968 | Martensson et al........... | 119/20 |

Primary Examiner—Hugh R. Chamblee
Attorney—Karl W. Flocks

ABSTRACT: An open framework pigpen particularly adapted for the raising and fattening of pork in which the pen includes displaceable wall portions for adjusting the confinement area in relation to animal growth and more particularly includes displaceable longitudinal and transverse walls, and in which the pen is relatively open and elevated, promotes circulation of air, includes a refuse canal to facilitate other removal of excreta and the like as well as permitting the pigs and pen to be readily washed, decontaminated, etc.

HYGENIC, VARIABLE CONFINEMENT AREA PIGPEN

This invention relates generally to animal husbandry and more particularly to a novel pigpen promoting the raising and fattening of swine.

Swine or pigs do not generally require a considerable running area and as a practical matter provide a greater market weight if they are not permitted to run excessively. Further, with rising land values and shortage of labor, it is highly desirable to provide one or more pigpens in which an animal can be readily confined, the walls can be adjusted as the animal grows and is fattened, and in which excreta and the like are deposited in a canal beneath the pigpen or banks of pigpens and drained to sewage facilities, thus promoting hygenic conditions and producing a more desirable healthy pig and desirable food product.

A primary object of the present invention is to provide a pigpen of the character mentioned above and more particularly a generally rectangular pen which includes an adjustable floor as well as adjustable sidewalls and end walls accommodating for changing growth and weight of a confined animal.

A more particular object of the present invention in conformance with that set forth above is to provide in an adjustable pigpen a skeletonized roof or frame structure preventing escape of the animal from the pen as well as providing a sufficiently elevated pen to promote circulation of air and washing to raise pigs under the most health conditions.

These, together with other and more specific objects and advantages of the invention, become apparent from a consideration of the specification when taken in conjunction with the drawing forming a part hereof in which.

Referring to FIGS. 1 through 10, the variable area confinement sty or pigpen comprises a fixed installation over a transversely extending disposal canal C which extends beneath the rear, generally open end of the pen. Preferably, but not necessarily, a fixed rear wall R and a support surface G are provided as illustrative of a typical installation. The generally skeletonized or open pigpen can be produced from any suitable materials including wood, metal extrusions, plastic extrusions, plastic moldings, etc., and a series of banks of pens can be provided.

Figure 1:
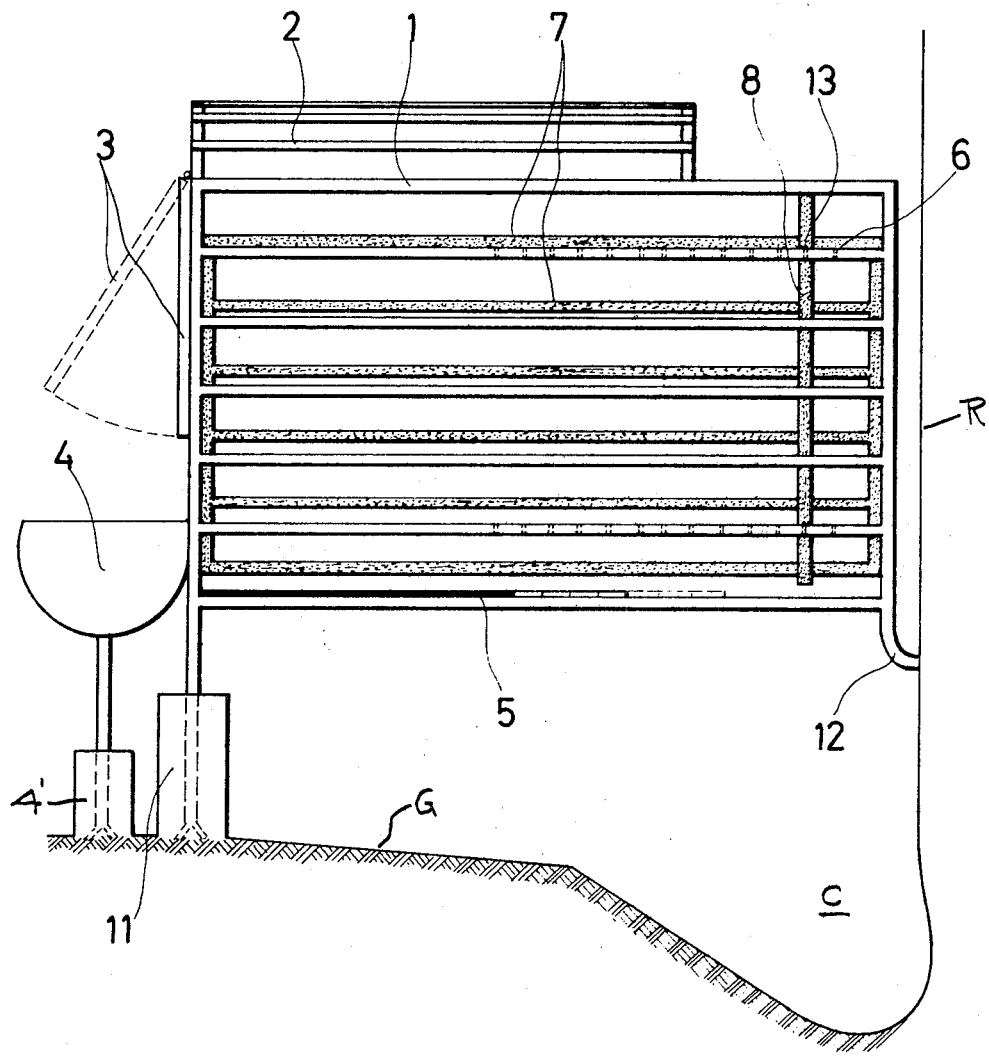
FIG. 1 is a side elevational view of a pen illustrating the invention, showing by dotted lines a displaceable forward wall affording access to a feed trough.
Figure 2:
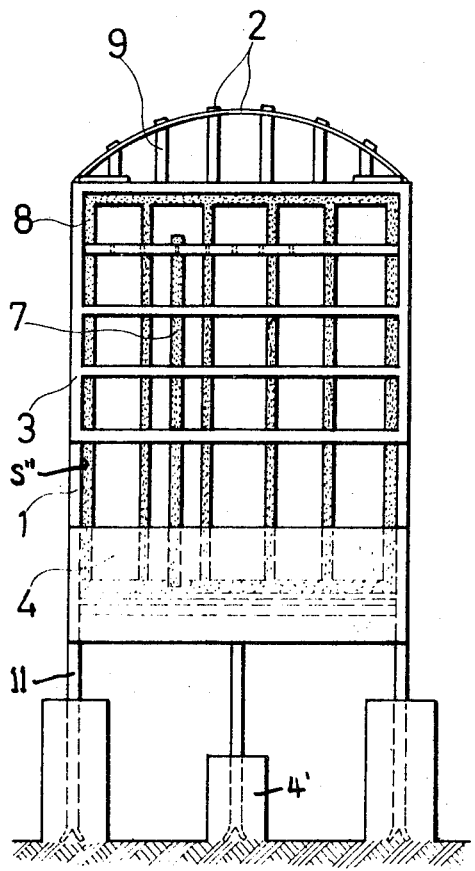
FIG. 2 is a front elevational view looking from left to right at FIG. 1.
Figure 3:
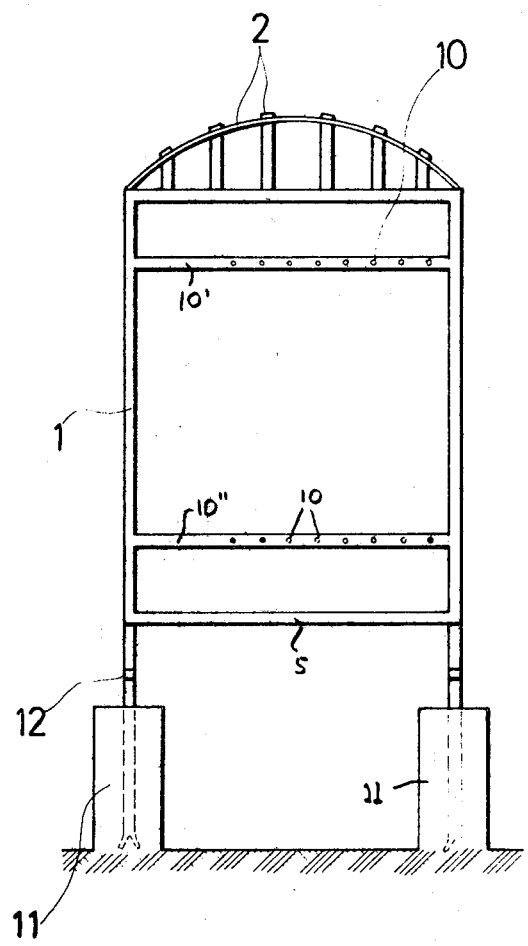
FIG. 3 is a rear elevational view looking from right to left at FIG. 1.

The skeletonized pigpen comprises a bottom floor 5 integral with a vertically extending enclosing wall assembly including sidewalls formed by vertically spaced horizontally disposed rails S', a generally open rear end; see FIG. 3, and a generally open forward wall having an access opening S'' controlled by an animal-displaceable gate 3; see FIGS. 1 and 2. The enclosure includes rearwardly extending feet 12 which are suitably anchored in the rear wall R and depending forward feet 11 anchored in concrete blocks, for example. Extending transversely beneath the access opening S'' is a feed trough 4. Additionally, and to prevent the animal from climbing out of the confinement area (which frequently occurs with respect to swine), is a generally arched and removable roof 2.

Figure 10:
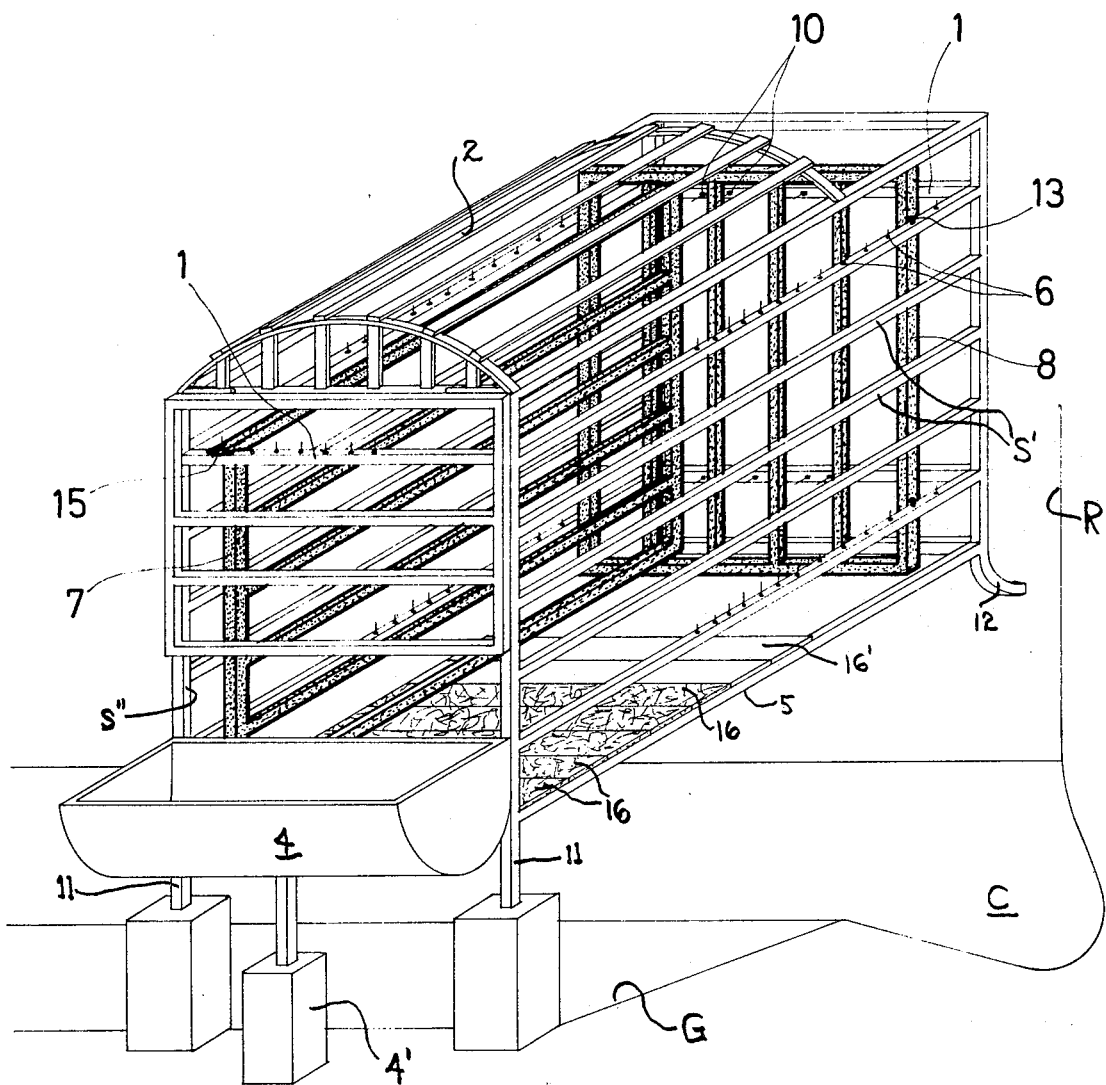
FIG. 10 is a perspective view showing the partition elements of FIGS. 5 and 6 installed.

Referring to the bottom wall or floor 5, it will be noted that this comprises a plurality of transversely disposed planks or boards or board elements 16 which can be removably replaced in relation to length of the animal. Inwardly beyond the rearwardmost plank 16'; see FIG. 10, is an open space 17 over which the tail end of the animal will be disposed. During normal body functions, excreta will gravitate into the canal C and can be readily and rapidly washed away and removed. Thus the animal will not be continually standing in germ-producing filth which sometimes occurs in conventional pigpens and sties.

The trough 4 is supported by a depending leg and concrete block 4', and although only a single pen or pigsty is shown in detail, it is readily apparent that a plurality of such sties can be installed alongside each other; the amount of food for each animal can be carefully controlled and rationed, the animals will not mix with each other, so that fighting does not occur with its accompanying damage to the animals, and the swine are maintained in a condition and position to be kept as clean as possible, separated from each other and to be fed and fattened to the degree most conducive to a good return for the swineherder's time and effort.

Figure 7:
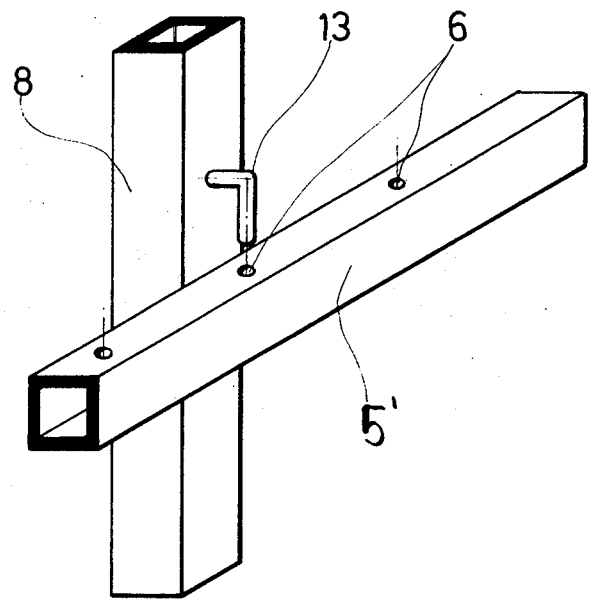
FIG. 7 is an enlarged fragmentary perspective view showing the manner in which the transverse partition or grate of FIG. 6 can be adjustably positioned.
Figure 8:
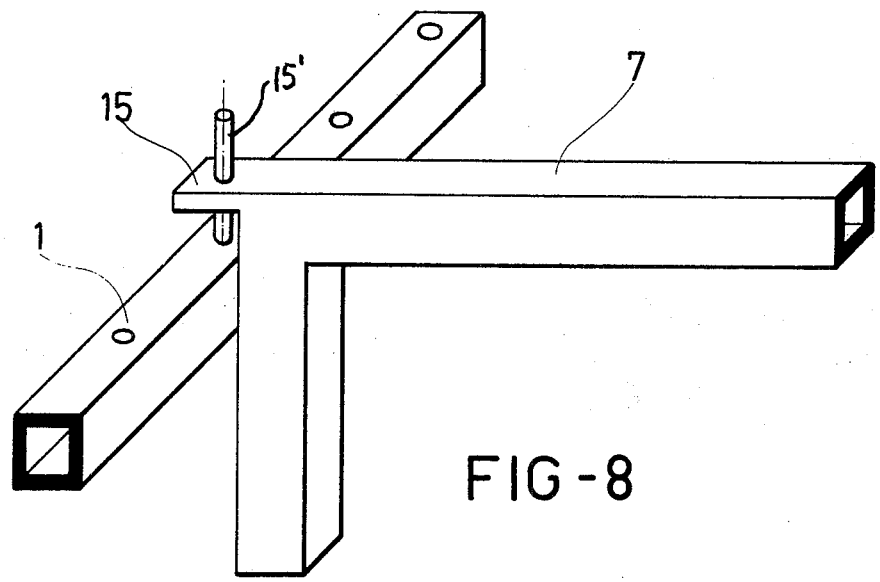
FIG. 8 is an enlarged fragmentary perspective view illustrating the manner in which the displaceable, longitudinal element of FIG. 5 can be adjustably positioned.
Figure 9:
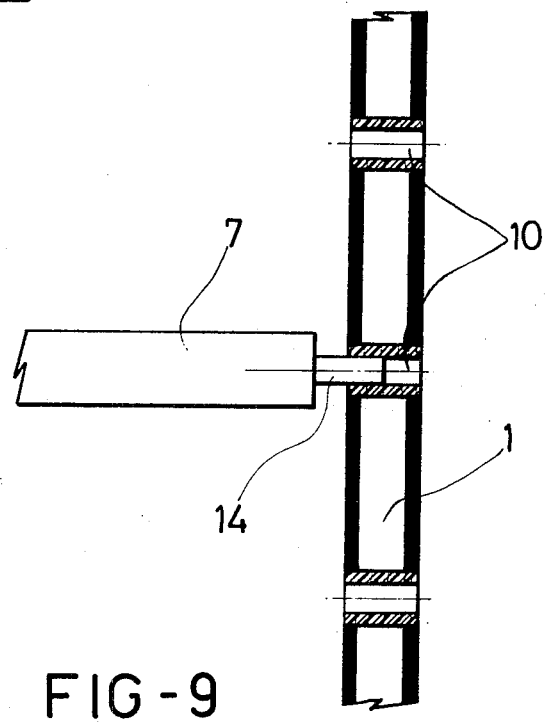
FIG. 9 is an enlarged fragmentary section showing the manner in which the rear ends of the longitudinal partition elements of FIG. 5 are removably mounted.

The pen or sty is preferably constructed to have a generally rectangular configuration and the individual elements utilized will preferably comprise rectangular tubing elements; see FIGS. 7 and 8, for example.

The sidewall elements 5' include means thereon for removably mounting a transversely disposed divider or grate element 8 which is also conveniently described as a supplemental wall element positionable longitudinally along the pen and extending transversely thereof. The supplemental wall 8 includes a plurality of vertically extending ribs or rails and has at opposite sides thereof laterally extending, downwardly disposed hook elements 13; see FIGS. 6 and 7. The vertically spaced and longitudinally extending sidewall elements 5' include therein longitudinally spaced, transverse holes 6 which removably receive the hooks 13.

Accordingly, the element 8 can be lifted and slid longitudinally with respect to the confinement area or cage proper to adjust the useable length of the pen. Further, the rearwardmost plank or board 16' can be removed, as can the others, accordingly adjusting the size of the opening 17 to accommodate to the size of the animal. It will be observed that since a transverse wall element 8 is provided, it is unnecessary to provide a closure for the rearwardmost end of the cage or pen proper; further, since the pen is substantially adjacent the rear wall R; see FIG. 1, it is unnecessary to use extra material to close the rear end of the cage proper.

The width of the cage proper is adjusted by a longitudinally extending, transversely adjustable auxiliary or supplemental wall element 7; see FIGS. 4, 5, 8 and 9, for example.

The rearwardmost end of the cage proper includes horizontally extending support elements 10' and 10''. These support elements have extending horizontally therethrough transversely spaced holes 10 for accommodating therein suitably spaced connecting pins 14 projecting rearwardly from the vertical edge of the supplemental longitudinally extending wall element 7; see FIG. 9. Projecting forwardly from the uppermost edge of the auxiliary separator wall 7 is a lip or flange 15 in which is formed a transverse hole receiving therein a suitable fastener element such as a pin or screw 15'; see FIG. 8, formed in an upper frame element of the forward wall of the pen.

OPERATION

Due to its skeletonized character, the pen and various portions thereof can be readily sterilized and air circulating within a barn or similar pighouse will readily circulate through the cage, maintaining the swine in a comfortable temperature, and washing is facilitated.

Figure 4:
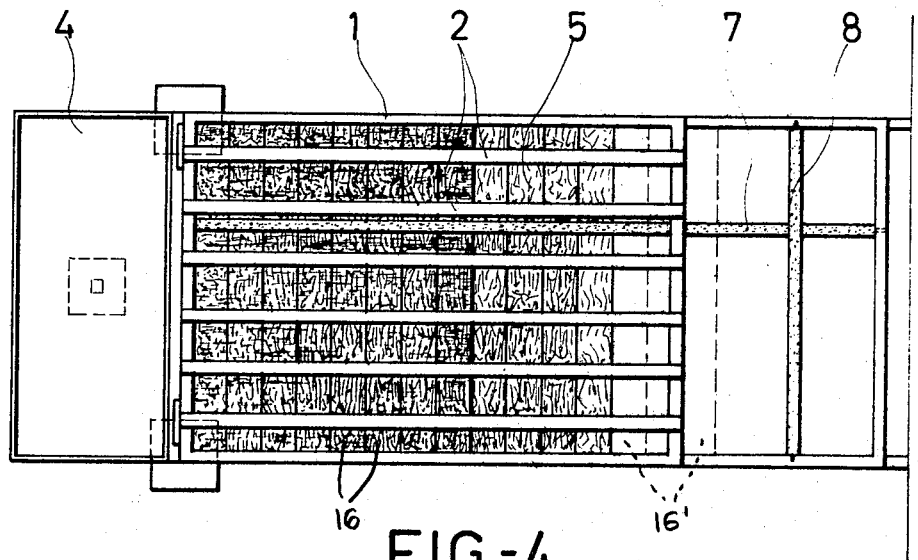
FIG. 4 is a top plan view of FIG. 1.
Figure 5A:
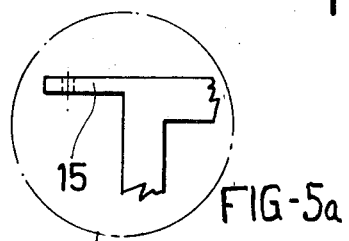
FIG. 5a is a fragmentary enlarged view of the fragmentary portion circled in FIG. 5.
Figure 5:
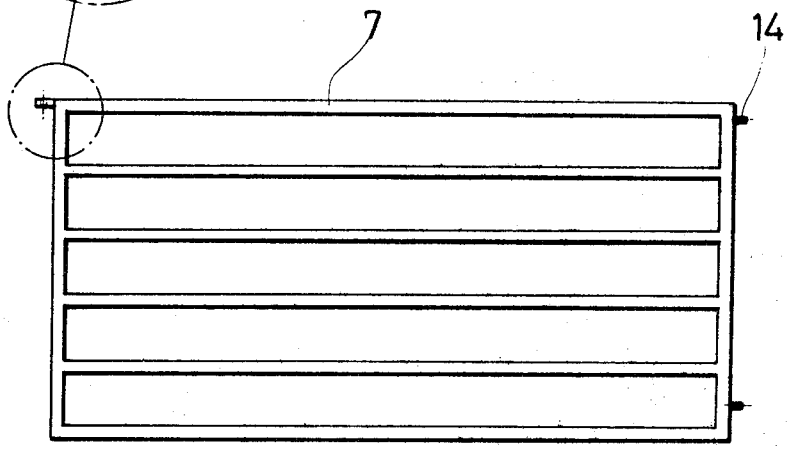
FIG. 5 is a side elevational view of a longitudinally extending, displaceable partition or grate element.
Figure 6:
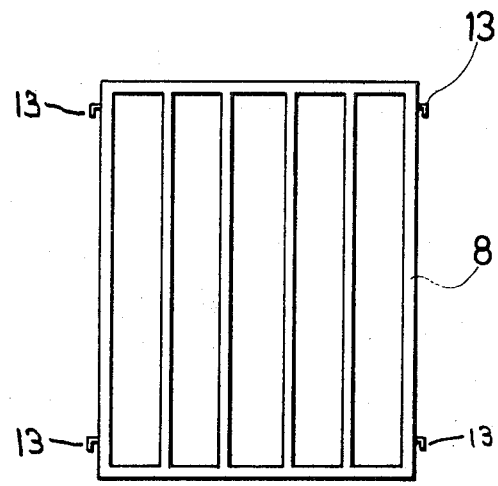
FIG. 6 is a plan view of a transverse, displaceable partition or grate element.

Depending upon the size of the pig to be fattened, the floorboards or planks 16, 16' are installed together with the longitudinally extending supplemental wall 7 and supplemental transverse wall 8; see FIG. 4. The pig is confined against excess movement rearwardly and sidewardly by the supplemental walls 7 and 8 and the cover is positioned to prevent the pig from climbing out of the pen.

The food trough 4 is filled with water or feed and a record is kept of the amount of feed in relation to animal weight, facilitating determination of the percentage of profit realized on a given pig in relation to the amount of money expended for food, for example.

As the pig increases in girth, the supplemental wall 7 can be adjusted transversely, and likewise, as the pig increases in length, the supplemental wall 8 is moved rearwardly and additional floor or planks 16' are installed.

As previously mentioned, pig can readily displace the access door 3 and eat from the trough 4, and further excreta and the like fall into channel C and can be readily washed or sterilized as can the feed trough, etc. Still further, danger to the farmer is minimized, since mobility of the pig is reduced to a minimum and the danger of falling into a pigpen and being trampled and eaten by swine is reduced to a minimum if not eliminated.

What is claimed is:

1. An animal pen comprising a floor and an enclosing wall assembly extending vertically from said floor and defining a confinement area,
   feed trough means accessibly disposed adjacent one end of said enclosing wall assembly,
   said enclosing wall assembly including means for providing access to said feed trough means, the improvement in which:
   said enclosing wall assembly comprises displaceable wall portions for adjusting the confinement area in relation to animal size,
   said displaceable wall portions including means providing a plurality of adjusted positions for altering the confinement area in relation to animal growth,
   means supporting the pen in an elevated position,
   a refuse collection canal extending transversely beneath the pen below and opposite the end of the pen at which said feed trough means is disposed,
   said pen floor comprising a plurality of removable floor elements for adjusting the size of an unobstructed opening at the rear end of the pen opposite said feed trough means and immediately overlying said refuse collection canal,
   said means for providing a plurality of adjusted positions of said displaceable wall portions comprising a longitudinally extending auxiliary wall element disposed in a plane intersected by a transversely disposed auxiliary wall element,
   said enclosing wall being generally rectangular when view in plan, said displaceable wall portions being substantially rectangular and adjustable longitudinally and transversely in said confinement area, said means for providing a plurality of adjusted positions comprising fasteners extending laterally from the respective transversely and longitudinally adjustable auxiliary wall elements and removably engaged in cooperating portions of said enclosing wall assembly.

2. An animal pen comprising a floor and an enclosing wall assembly extending vertically from said floor and defining a confinement area,
   said enclosing wall assembly comprising displaceable wall portions for adjusting the confinement area in relation to animal size,
   said displaceable wall portions including means providing a plurality of adjusted positions for altering the confinement area in relation to animal growth,
   said means for providing a plurality of adjusted positions of said displaceable wall portions comprising a 3. An animal pen comprising a floor and an enclosing wall assembly extending vertically from said floor and defining a confinement area,
   said enclosing wall assembly comprising displaceable wall portions for adjusting the confinement area in relation to animal size,
   said displaceable wall portions including means providing a plurality of adjusted positions for altering the confinement area in relation to animal growth,
   said enclosing wall being generally rectangular when view in plan,
   said displaceable wall portions being substantially rectangular and adjustable longitudinally and transversely in said confinement area,
   said means for providing a plurality of adjusted positions comprising fasteners extending laterally from the respective transversely and longitudinally adjustable auxiliary wall elements and removably engaged in cooperating portions of said enclosing wall assembly.

4. An animal pen comprising a floor and an enclosing wall assembly extending vertically from said floor and defining a confinement area,
   said enclosing wall assembly comprising displaceable wall portions for adjusting the confinement area in relation to animal size,
   said displaceable wall portions including means providing a plurality of adjusted positions for altering the confinement area in relation to animal growth,
   means supporting the pen in an elevated position,
   feed trough means accessibly disposed adjacent one end of said enclosing wall assembly,
   a refuse collection canal extending transversely beneath the pen below and opposite the end of the pen at which said feed trough means is disposed,
   said refuse canal sloping downward from the side having said feed trough and sloping sharply downward from a substantially center portion of said downward slope, and rounding of the bottom of said canal at the bottom of said slope,
   said pen floor comprising a plurality of removable floor elements for adjusting the size of an unobstructed opening at the rear end of the pen opposite said feed trough means and immediately overlying said refuse collection canal.

* * * * *

UNITED STATES PATENT OFFICE
CERTIFICATE OF CORRECTION

Patent No. 3,631,839                    Dated January 4, 1972

Inventor(s)   Agustin POSTIGO PASCUAL

It is certified that error appears in the above-identified patent and that said Letters Patent are hereby corrected as shown below:

Column 1, line 1, should read:

Inventor: Agustin Postigo Pascual

Signed and sealed this 30th day of May 1972.

(SEAL)
Attest:

EDWARD M. FLETCHER, JR.            ROBERT GOTTSCHALK
Attesting Officer                  Commissioner of Patents